United States Patent [19]

Wallis

[11] Patent Number: 5,407,091
[45] Date of Patent: Apr. 18, 1995

[54] RAINWATER STORAGE TANKS

[76] Inventor: Martin Wallis, 4/169 South Creek Road, Dee Why, New South Whales 2099, Australia

[21] Appl. No.: 220,113

[22] Filed: Mar. 30, 1994

[51] Int. Cl.⁶ .............................................. B65D 1/24
[52] U.S. Cl. .................................... 220/565; 220/501; 220/216
[58] Field of Search ............... 220/565, 567, 571, 501, 220/226, 239

[56] References Cited

U.S. PATENT DOCUMENTS

| | | | |
|---|---|---|---|
| 280,820 | 7/1883 | Hickson | 220/216 |
| 1,334,078 | 3/1920 | Burruss | 220/216 |
| 1,775,349 | 9/1930 | Kaun | 220/216 |
| 2,351,850 | 6/1944 | Wiggins | 220/216 |
| 5,252,302 | 10/1993 | Schmidt et al. | 220/565 |
| 5,282,540 | 7/1994 | Bauer | 220/565 |

Primary Examiner—Joseph Man-Fu Moy
Attorney, Agent, or Firm—Edwin D. Schindler

[57] ABSTRACT

A water storage outer tank (1) has an opening (9) in the top (5) and an opening (10) in the bottom (6). An open topped elongated diverter tank (13) with an open top and a discharge opening (17) is housed within the outer tank (1) with a discharge opening (17) sealingly mounted over the outer tank bottom opening (10) and the open top of the diverter tank (13) aligned with the tank opening (9). A divider (24) with a valve seating opening (25) divides the diverter (13) into an upper zone and a lower zone which houses a buoyant float valve (26). Openings (23) upstream of the divider (24) pass water from the diverter upper zone to the interior of the tank (1) when the diverter tank lower zone is filled with water to the extent that the float valve (26) seals off the opening (25).

6 Claims, 2 Drawing Sheets

RAINWATER STORAGE TANKS

This invention relates to storage tanks for rainwater and has as its principal innovative feature the inclusion within the water storage tank of an internal 'first flush' tank to collect the first flush of rainwater from a catchment and to discharge it external to the a main storage area for the rainwater.

There have been some attempts hitherto to achieve the above objective. Many of those attempts have involved complex arrangements and in other arrangements have involved the coupling of external first flush collector to a conventional water storage tank. The latter arrangement is often not well regarded by persons seeking a rainwater tank for several reasons. Examples are the expense involved in the purchase of an "add on" first flush collector, the problems of initial installation of the collector into the building catchment system and the apparent presence of the collector.

The approach in the present invention is to provide an integrated unit of streamline configuration which is simple in operation, reliable and economical to manufacture and simple to install.

Broadly, the present invention provides a water storage tank with a water holding compartment defined by a circumscribing wall and a top and a bottom, an aperture in both said top and bottom, an elongated diverter tank housed within said compartment, said diverter tank has an open top and a bottom closed except for a discharge opening, coupling means sealingly coupling said diverter tank to the bottom of said compartment with the respective discharge opening and aperture aligned to permit said diverter tank to discharge to waste, said diverter tank having a length such that its top lies adjacent the top of said compartment, a divider mounted in said diverter tank adjacent but spaced from the open top thereof to divide the diverter tank into an upper zone and a lower zone separated by a valve seat opening in said divider, a buoyant float mounted in said lower zone adapted on engagement with said valve seat opening to seal the lower zone from the upper zone, bypass openings in said diverter tank connecting the upper zone thereof to the water holding compartment, and said tank including an opening to allow discharge of water from said compartment.

A presently preferred embodiment of the invention will now be described with reference to the accompanying drawings in which.

Figure 1:
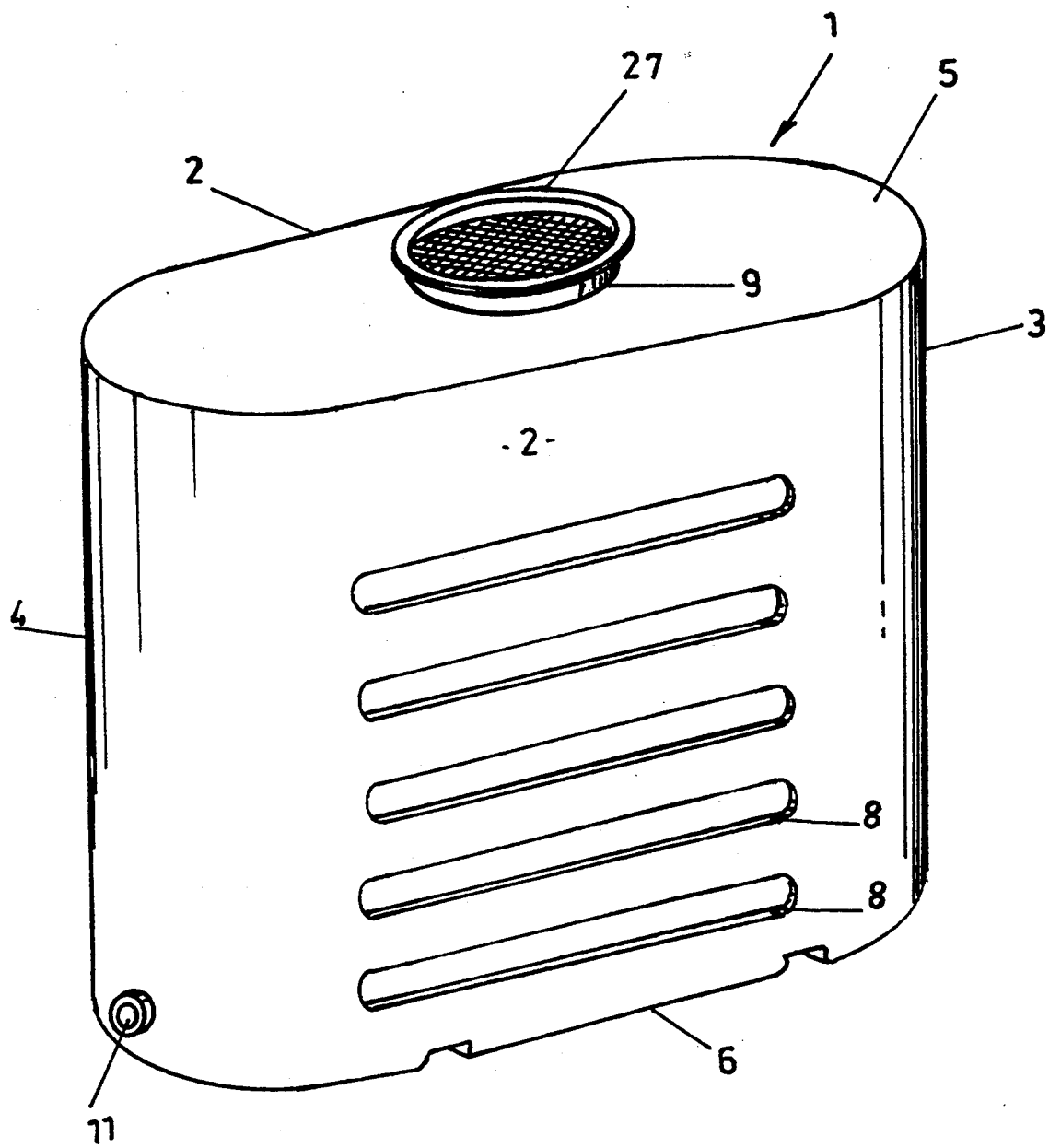
FIG. 1 is a perspective view of a tank according to the invention.
Figure 2:
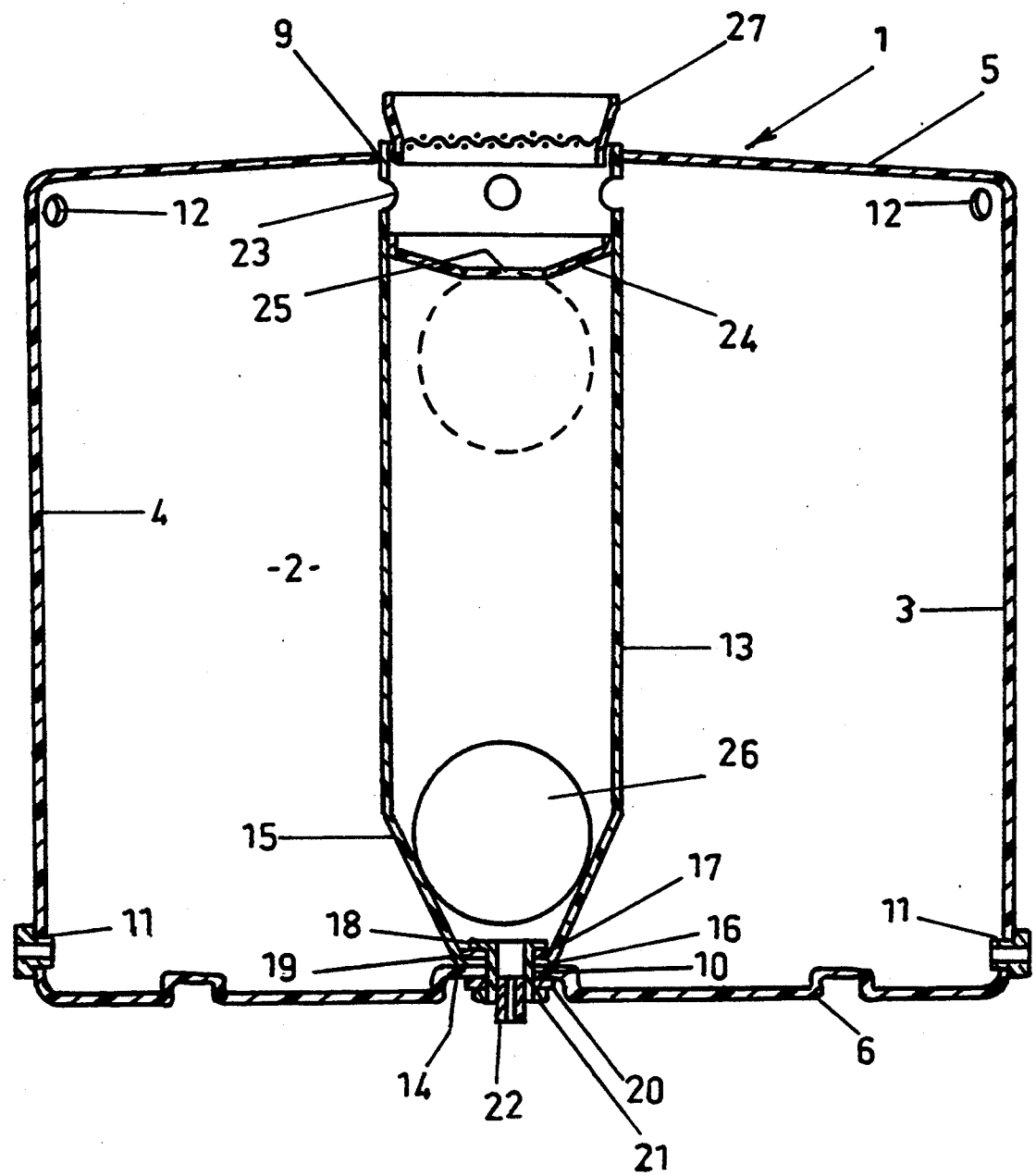
FIG. 2 is a sectional elevation of the tank of FIG. 1.

As illustrated the tank includes a hollow body 1 with straight sides 2 and curved ends 3 and 4 and a top 5 and a bottom 6. The body 1 has inwardly directed strengthening ribs 8. Preferably the tank is rotomoulded from a food grade U.V. stabilised polyethylene.

There is a large hole 9 in the body top 5 and there is a smaller hole 10 in a depression 14 in the body bottom 6. There is also a hole 11 in each end of the tank adjacent the bottom for selective fitting of a water take off tap of some type or connection to a water reticulation system. In the case of a tap take off this can be downstream of a fine filter unit of known type. Adjacent the top of the body there are overflow openings 12.

Mounted within the water holding compartment of the body 1 there is a a diverter tank 13 which is tubular for most of its length and circular in cross-section and it has a tapered lower portion 15 terminating a flat end 16 adapted by size to overlie the inner face of the depression 14. The outside diameter of the diverter tank 13 is a sliding fit in the hole 9 in the body top and the length of the diverter tank 13 is such that when the end 16 rests on the inner face of the depression 14 there is a short portion of the diverter tank 13 extending above the body top 5.

There is a hole 17 in the bottom 16 of the diverter tank 13 and a threaded fitting 18 with a through bore and a top flange is assembled with an internal washer 19 and an external washer 20 and a nut 21 to clamp the bottom of the diverter tank 13 to the inner face of the depression 14 in a sealing manner. A discharge flow control means 22 is mounted in the outer end of the bore of the member 18.

There is a downwardly dished divider 24 mounted through a flange to the inner wall of the diverter tank 13 adjacent but spaced from the open top thereof to divide the diverter tank 13 into an upper zone and a lower zone. There is a valve seat opening 25 in the divider and there is a buoyant spherical float 26 mounted in the lower zone adapted on engagement with the valve seat opening 25 to seal the lower zone of the diverter tank from the upper zone thereof. The dishing of the divider 24 ensures water falling on the diverter will flow to the valve seat opeing 25.

A primary screen type filter in the form of a cap 27 is seated in the open upper end of the diverter tank 13.

In an operational sequence, the first flush of rainwater will flow into the cap 27 and then pass into the diverter tank 13. If the rain is of drizzle type it will flow into the diverter tank lower zone and the discharge therefrom through 22 will probably prevent an accumulation in the diverter tank 13. If the amount and rate of rainfall is more than a trickle it will carry debris, such as twigs and leaves, and these will be trapped and held in the screen of the cap 27 and the rainwater will flow into the diverter tank 13. The result of a substantial shower of rain is that there will be a net accumulation of water in the lower zone of the diverter tank 13. As the lower zone fills the float 26 will move upwardly and eventually seal off the opening 25. This prevents water entering the diverter tank lower zone and the water entering the diverter tank upper zone will pass through the holes 23 into the water holding compartment of the tank.

The collection process will continue until the water holding compartment of the tank 1 is filled and at that time excess rainwater will flow from the overflow outlet suitably positioned adjacent the top of the tank 1. When the rain stops the tank 1 will contain substantially clean water and the diverter tank 13 will continue to trickle discharge through the member 22 until the diverter tank 13 is empty. The system will then be ready for the next rain collection.

Water can be removed from the tank in a number of ways, for example a water reticulation system can be connected to the tank at 11. Alternatively a tap can be connected to the tank at 11. If the water from the tank is for drinking it is first passed through a fine filter means associated with the reticulation system or the tap, as the case may be.

In a typical arrangement the tank would have a capacity of 400 liters and the diverter tank would have a capacity of about 50 liters giving a water storage compartment of about 350 liters. The size of the diverter tank has been calculated on the basis that foreign matter such as dust and the like would be removed from the water catchment in the first 50 liters rainwater to pass over the water a catchment.

The foregoing is a description of a presently preferred arrangement and it is to be understood that changes can be made to the components described and their relationships without departing for the inventive concept therein disclosed.

I claim:

1. A water storage tank with a water holding compartment defined by a circumscribing wall and a top and a bottom, an aperture in both said top and bottom, an elongated diverter tank housed within said compartment, said diverter tank has an open top and a bottom closed except for a discharge opening, coupling means sealingly coupling said diverter tank to the bottom of said compartment with the respective discharge opening and aperture aligned to permit said diverter tank to discharge to waste, said diverter tank having a length such that its top lies adjacent the top of said compartment, a divider mounted in said diverter tank adjacent but spaced from the open top thereof to divide the diverter tank into an upper zone and a lower zone separated by a valve seat opening in said divider, a buoyant float mounted in said lower zone adapted on engagement with said valve seat opening to seal the lower zone from the upper zone, bypass openings in said diverter tank connecting the upper zone thereof to the water holding compartment, and said tank including an opening to allow discharge of water from said compartment.

2. A tank as claimed in claim 1 including a primary filter mounted in the open top of the diverter tank upstream from said bypass openings.

3. A tank as claimed in claim 1 where the top end of the diverter tank passes through the aperture in the top of said water holding compartment to thereby stabilise the top end of said diverter tank against lateral movements.

4. A tank as claimed in claim 1 where said coupling means includes a tubular member for the discharge of water from said diverter tank and the tubular member is adapted to be fitted with a means to regulate the flow of water from said diverter tank.

5. A tank as claimed in claim 1 where said divider includes an upwardly outwardly angled face extending from said valve seat opening to a fixing flange whereby said divider is connected to the inner wall of said diverter tank, said face ensuring any water falling on said divider is directed to said valve seat opening.

6. A tank as claimed in claim 1 when made from polyethylene.

* * * * *